(12) United States Patent
Vendrow (10) Patent No.: US 9,035,879 B2
(45) Date of Patent: May 19, 2015

(54) DIGITAL SIGNS

(75) Inventor: Alex Vendrow, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 1460 days.

(21) Appl. No.: 12/705,080

(22) Filed: Feb. 12, 2010

(65) Prior Publication Data

US 2011/0199290 A1     Aug. 18, 2011

(51) Int. Cl.
*G06F 3/033* (2013.01)
*G09G 5/08* (2006.01)
*G06F 3/023* (2006.01)
*G06F 3/038* (2013.01)

(52) U.S. Cl.
CPC .............. *G06F 3/023* (2013.01); *G06F 3/038* (2013.01)

(58) Field of Classification Search
CPC ..................... H04N 5/4403; H04N 5/4407
USPC .................................................. 345/156–173
See application file for complete search history.

(56) References Cited

U.S. PATENT DOCUMENTS

| | | | |
|---|---|---|---|
| 2001/0032880 A1* | 10/2001 | Levine | 235/384 |
| 2003/0007104 A1* | 1/2003 | Hoshino et al. | 348/734 |
| 2007/0136133 A1 | 6/2007 | Li | |
| 2007/0136778 A1* | 6/2007 | Birger et al. | 725/117 |
| 2007/0252891 A1 | 11/2007 | Gurley | |
| 2011/0138317 A1* | 6/2011 | Kang et al. | 715/780 |
| 2011/0161163 A1* | 6/2011 | Carlson et al. | 705/14.44 |

* cited by examiner

*Primary Examiner* — Ricardo L Osorio (57) ABSTRACT

A method for pairing a control device with a digital sign is provided. The method includes receiving control device geometric attributes and digital sign geometric attributes, determining a digital sign identification based on the control device geometric attributes and the digital sign geometric attributes, and transmitting the digital sign identification to the control device. The control device geometric attributes may define geometric attributes of the control device. The digital sign geometric attributes may define geometric attributes of the digital sign that the control device is attempting to control. The digital sign identification may define the digital sign that the control device.

25 Claims, 8 Drawing Sheets

| ATTRIBUTE/IDENTIFICATION RECORD 90 | | |
|---|---|---|
| DS1<br>GA Range 92<br>DSD ID 102 | DS2<br>GA Range 94<br>DSD ID 104 | DS3<br>GA Range 96<br>DSD ID 106 |
| DS4<br>GA Range 98<br>DSD ID 108 | ... | DSn |

DIGITAL SIGNS

FIELD

The present embodiments relate generally to digital signs.

BACKGROUND

Digital signs are used to display content, such as information, advertising, and other messages, and may be found in public and private environments, such as residential homes, retail stores, and corporate buildings. Interactive digital signs allow users to interact with or control the content displayed on digital signs using a control device. The control device may be, for example, a touch screen, a remote control, a keyboard, or a mobile device. In order to control the digital sign, a control device is paired to the digital sign.

DETAILED DESCRIPTION

Overview

In one embodiment, a digital sign system may include a control device, a digital sign, and a management system. The management system may be operable to pair the control device with the digital sign, such that the control device is able to control (e.g., interact with or communicate with) the digital sign. In order to pair the control device and the digital sign, the management system may receive control device geometric attributes from the control device. Control device geometric attributes may define geometric attributes of the control device. Upon receiving control device geometric attributes, the management system may compare the control device geometric attributes to one or more digital sign geometric attributes and determine a digital sign identification based on the comparison. The digital sign identification may uniquely identify the digital sign that the control device is attempting to control. For example, the digital sign identification may be an address, number, tag, or other identifier that may be used to initiate communication with the digital sign. The management system may transmit the digital sign identification to the control device.

Description

The present embodiments relate generally to pairing a control device and a digital sign. As used herein, the terms "pairing" and "pair" relate generally to setting up communication between the control device and the digital sign such that the control device may be used to control (e.g., interact with) the digital sign. For example, the term pairing may include enabling and/or initiating communication, a pairing process, a handshake process, an authentication process, or other process that allows the control device to begin controlling the digital sign. In one example, pairing include providing the control device with a digital sign identification used to communicate with the digital sign. The digital sign identification may be used to initiate communication with the digital sign. In another example, pairing includes automatically connecting the control device with the digital sign.

In one embodiment, communication setup may be based on geometric attributes of the control device and/or digital sign. Geometric attributes may include positional and/or directional attributes, such as a control device direction, digital sign direction, control device angle, an intersection point, or any combination thereof. Geometric attributes may be used to identify which digital sign (e.g., relative to other digital signs) the control device is attempting to control.

One benefit of pairing the control device and the digital sign based on geometric attributes is that the control device does not need to be hardwired to the digital sign in order to control the digital sign. Accordingly, a control device, such as a cellular telephone or personal digital assistant, may be used to control the digital sign. Instead of wires and cables, geometric attributes may be used to determine which digital sign the control device is paired to. Another benefit is that in response to pointing (e.g., positioned in the direction of) the control device at a digital sign, the control device may automatically or semi-automatically receive a digital sign identification for that digital sign. The user is not required to manually enter digital sign identifications into the control device in order to control the digital sign.

In one illustration, which will be referred to herein as "the illustration above," John walks through an exhibit hall and views two digital signs hanging next to each other on a wall. The first digital sign is displaying information, such as room number and time information, related to various conferences being held at the exhibit hall. The second digital sign displays advertising. The first and second digital signs are interactive (e.g., controllable or able to be paired with a control device). John would like to control the first digital sign and search for information related to a "computer programming conference." John points his control device at the first digital sign and transmits an identification request for a digital sign identification, for example, using an application stored on the cellular telephone. The identification request may include geometric attributes of the cellular telephone, such as the direction that the cellular telephone is pointing and the global positioning system coordinates of the cellular telephone. A management system may receive the identification request and determine the digital sign identification of the first digital sign based on the geometric attributes of the cellular telephone and the first digital sign. The digital sign identification may be transmitted back to the cellular device. The cellular device may use the digital sign identification to establish communication with the first digital sign. Alternatively, the management system may automatically connect the cellular device with the first digital sign.

In one aspect, a method includes receiving control device geometric attributes, the control device geometric attributes defining geometric attributes of the control device; comparing the control device geometric attributes to one or more digital sign geometric attributes; and determining a digital sign identification based on the comparison of the control device geometric attributes and the one or more digital sign geometric attributes, the digital sign identification defining the digital sign that the control device is attempting to control.

In a second aspect, a system includes a processor operable to receive control device geometric attributes, the control device geometric attributes defining geometric attributes of the control device; compare the control device geometric attributes to one or more digital sign geometric attributes; and determine a digital sign identification based on the comparison of the control device geometric attributes and the one or more digital sign geometric attributes, the digital sign identification defining the digital sign that the control device is attempting to control.

In a third aspect, a method includes determining control device location, direction, or location and direction for a control device attempting to control a digital sign; reporting the control device location, direction, or location and direction to a management system operable to pair the control device with the digital sign; in response to reporting the control device location, direction, or location and direction, receiving a digital sign identification that defines the digital sign; and initiating communication with the digital sign using the digital sign identification.

In a fourth aspect, a system includes a processor operable to determine control device location, direction, or location and direction for a control device attempting to control a digital sign; report the control device location, direction, or location and direction to a management system operable to pair the control device with the digital sign; in response to reporting the control device location, direction, or location and direction, receive a digital sign identification that defines the digital sign; and initiate communication with the digital sign using the digital sign identification.

The following description may be better understood with reference to the drawings. The components in the drawings are not necessarily to scale, emphasis instead being placed upon illustrating the principles of the various embodiments. Moreover, in the drawings, like referenced numerals designate corresponding parts or elements throughout the different views and embodiments.

Figure 1:
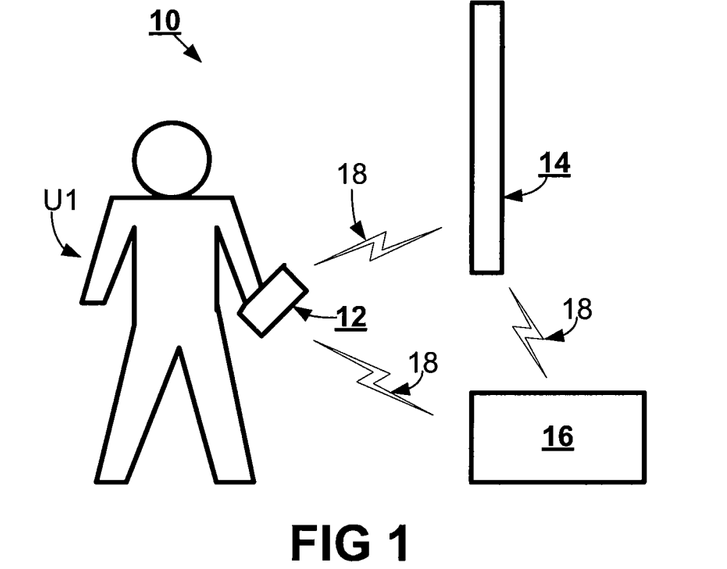
FIG. 1 illustrates one embodiment of a digital sign system.

FIG. 1 illustrates one embodiment of a digital sign system 10. The digital sign system 10 may include a control device 12, one or more digital signs (hereinafter, digital sign) 14, and a management system 16. The system 10 may include additional, different, or fewer components, such as additional control devices and/or digital signs. The management system 16 may be coupled with the control device 12 and digital sign 14. The control device 12 may be coupled with the digital sign 14. As used herein, the term "coupled with" may include directly connected to or indirectly connected via one or more intermediary components. Intermediary components may include hardware components, software components, or communication networks. The term "coupled with" may include hardwired or wireless components.

The control device 12 may be owned, operated, controlled, managed, associated with, or used by a user U1. The user U1 may be a human or electronic computer device (e.g., including a processor and memory) programmed or configured to control the control device 12. In the illustration above, John is user U1.

The control device 12, digital sign 14, and management system 16 may communicate via one or more networks (hereinafter, network) 18. The network 18 may be a telecommunication network, wired or wireless network, cellular network, public switched telephone network, radio network, infrared network, local area network, wide area network, client-server network, personal area network, category-5 cable network, fiber optic network, Internet network, or a combination thereof. In one example, the management system 16 may communicate with the control device 12 via a cellular network and the digital sign 14 via a wired or wireless network. Other arrangements are also possible.

The digital sign system 10 may be used to pair the control device 12 with the digital sign 14. Pairing may include enabling communication between the control device 12 and the digital sign 14. For example, in one embodiment, pairing includes providing the control device 12 and/or digital sign 14 with an identification that may be used to initiate communication between the control device 12 and/or digital sign 14. The identification may uniquely (e.g., relative to other digital signs) identify the digital sign that the control device 12 is attempting to control. Pairing may also include determining which digital sign 14 that the control device 12 is attempting to control based on, as a function of, depending on, or using geometric attributes of the control device 12 and/or digital sign 14.

As used herein, geometric attributes may include directional attributes and/or positional attributes. Directional attributes may include a direction of the control device 12 and/or digital sign 14. For example, the control device 12 may be pointing North, East, South, West, or a variation thereof and the direction may be a directional attribute. As another example, the control device 12 may be moving in a given direction, and the direction of movement may be a directional attribute. Positional attributes may include a position of the control device 12 and/or digital sign 14, relative to a common coordinate system. Exemplary coordinate systems include Cartesian coordinate systems, geographic coordinate systems, Global Positioning Systems (e.g., using the WGS84 coordinate system), Universal Transverse Mercator (UTM) coordinate systems, and Universal Polar Stereographic (UPS) coordinate systems. The position may be defined as a set of coordinates.

In order to determine which digital sign 14 that the control device 12 is attempting to control, the geometric attributes of the control device 12 and/or digital sign 14 may be used to determine combination attributes of both the control device 12 and digital sign 14. Exemplary combination attributes include angles, distances, intersection points, or directions between the control device 12 and a digital sign 14. Combination attributes may be calculated using the geometric attributes of the control device 12 and/or digital sign 14. For example, positional attributes of both the control device 12 and digital sign 14 may be used to determine a distance between the control device 12 and the digital sign 14. The distance may be a combination attribute. Difference in direction may be another example combination attribute. Combination attributes may be compared to geometric attribute ranges assigned to each digital sign 14. The digital sign 14 with the combination attributes closest to, within, or the same as the geometric attribute range may be identified as the digital sign 14 that the control device 12 is attempting to control.

Figure 2:
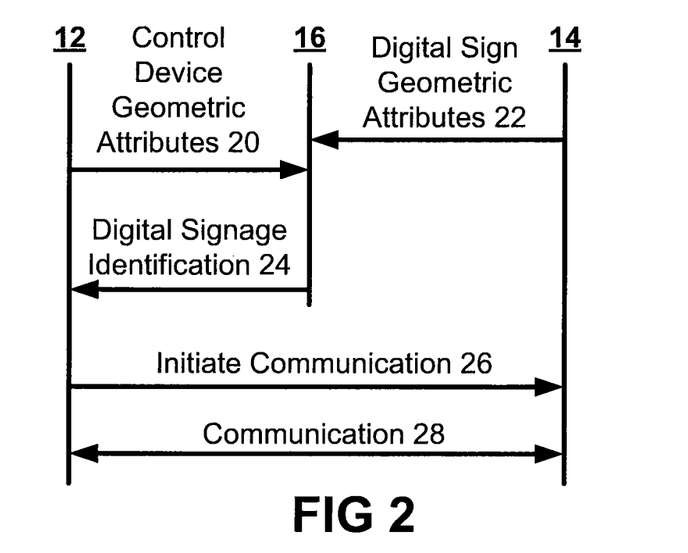
FIG. 2 illustrates one embodiment of the interaction between a control device, digital sign, and management system.

FIG. 2 illustrates one embodiment of the interaction between the control device 12, digital sign 14, and management system 16. The control device 12 may determine one or more control device geometric attributes 20 (i.e., geometric attributes of the control device 12), such as control device direction and control device position. Control device geometric attributes 20 may be transmitted to the management system 16, for example, as part of a digital sign identification request message. The digital sign 14 may determine one or more digital sign geometric attributes 22 (i.e., geometric attributes of the digital sign 14). The control device geometric attributes 22 may be transmitted to the management system 16, for example, as part of a setup message or answer message. The geometric attributes 20 and/or 22 may be provided to the management system 16 in any order. For example, the digital sign geometric attributes may be provided to the management system 16 prior to the control device geometric attributes 22, or vice-versa. The geometric attributes 20 and/or 22 may be transmitted in one or more messages to management system 16. In an alternative embodiment, the geometric attributes 20 and/or 22 may be entered into the management system 16, for example, using a keyboard or memory storage device slot. The geometric attributes 20 and/or 22 do not need to be sent via messages.

In one example, when a screen is mounted or fixed, the Digital Sign Geometric Attributes 22 may be transmitted to the management system when the digital screen 14 is turned on or during a calibration process. However, in another example, when the screen is moving, the screen may transmit digital sign geometric attributes 22 in real time, when triggered, or periodically.

Upon receiving the geometric attributes 20 and/or 22, the management system 16 may determine which digital sign 14 that the control device 12 is pointing at or attempting to control using the geometric attributes 20 and/or 22. Once determined, the management system 16 may transmit a digital sign identification 24, which defines the identified digital sign 14, to the control device 12. The digital sign identification 24 may be transmitted from the management system 16 to the control device 12, for example, in an identification or pairing message. The digital sign identification 24 may be used to identify or connect with the identified digital sign 14. For example, the digital sign identification 24 may include a telephone number, network address, key, password, or other now known or later developed mechanism for establishing communication with a digital sign, device, or system. Once the digital sign identification 24 is received, the control device 12 may establish communication 26 with the digital sign 14 using the digital sign identification 24. Communication 26 may be established automatically (e.g., without further input from the user U1) or manually (e.g., with input from the user U1). Alternatively, the contact information of the control device 12 is provided to the digital sign 14, and the digital sign 14 contacts the control device 12.

Figure 3:
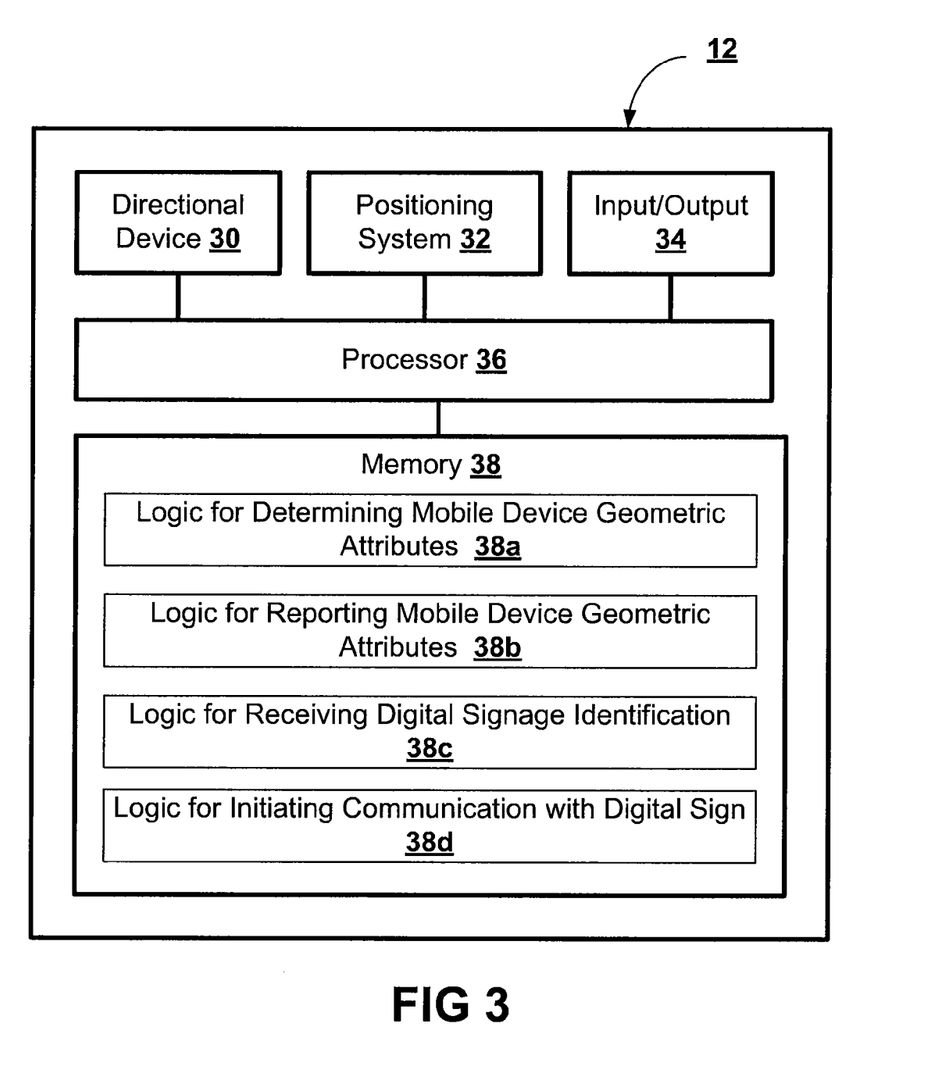
FIG. 3 illustrates one embodiment of a control device.

FIG. 3 illustrates one embodiment of a control device 12. The control device 12 may be a cellular telephone, personal computer, laptop, personal digital assistant, smart phone, mobile computing device, global positioning system, other now known or later developed communication device that is operable to interact with the digital sign 14, or a combination thereof. For example, the control device 12 may be an iPhone® sold by Apple, Inc. or HTC Fuze® sold by HTC, Inc. In the illustration above, the cellular telephone is the control device 12.

The control device 12 may include a directional device 30, positioning system 32, input/output 34, processor 36, and memory 38. The control device 12 may include additional, different, or fewer components. The processor 36 may be coupled with the directional device 30, positioning system 32, input/output 34, and memory 38. The control device 12 may be operable to determine geometric attributes about the control device 12, transmit the geometric attributes to the management system 16, receive a digital sign identification from the management system 16, and initiate communication with the digital sign 14.

The directional device 30 may be an electronic compass, magnetic compass, fibre optic gyrocompass, magnetometer, three-axis compass chip, global positioning system, orientation device, electronic static heading device, other device for determining a direction that the control device 12 is pointing or heading, or any combination thereof. For example, the directional device 30 may be the AK8973 three-axis electronic compass chip manufactured by Asahi Kasei Microsystems. In another example, the directional device 30 may be an Electronic Compass Board (ECB) evaluation module manufactured and sold by MEMSIC, Inc. In yet another example, the directional device 30 is a magnetic compass coupled with an electronic circuit that is operable to use the magnetic compass to determine a static heading of the control device 12. The top, bottom, or sides of the control device 12 may be used to determine direction. For example, the direction of the control device 12 may be based on the direction that the top of the control device 12 is pointing.

The positioning system 32 may be a global positioning system, navigation system, wireless positioning system, indoor positioning system, other system that is operable to determine a position of the control device 12, or a combination thereof. For example, the positioning system 32 may be a global positioning system that uses a satellite system to provide three-dimensional location (e.g., latitude, longitude, and altitude) of the control device 12. In another example, the positioning system 32 is a wireless positioning system, such as a cellular-based positioning system. The wireless positioning system may be a radio signal-based system that uses wireless local area networks (WLANs) and Wi-Fi signals. In another example, the wireless positioning system is an indoor positioning system that uses ultrasound or infrared to determine the position of the control device 12.

The input/output 34 may be an electronic display device, controller, other device for interacting with the control device 12, digital sign 14, or management system 16, or a combination thereof. The electronic display device may be a cathode ray tube (CRT), monitor, flat panel, a general display, LCD, projector, printer or other now known or later developed display device for outputting information. The electronic display device may display one or more images, such as text, video, pictures, or other data. The controller may be a keyboard, mouse, trackball, touch screen, or other device for controlling the control device 12.

The input/output 34 may include additional, different, or fewer components. For example, in one embodiment, the input/output 34 includes a communication interface that is operable to transmit messages to and receive messages from the digital sign 14 and/or management system 16. The communication interface may be an input interface and/or an output interface. In one embodiment, the communication interface may include a communication circuit and a radio that are operable to transmit and receive messages. The messages may include geometric attributes and digital sign identifications.

Figure 4:
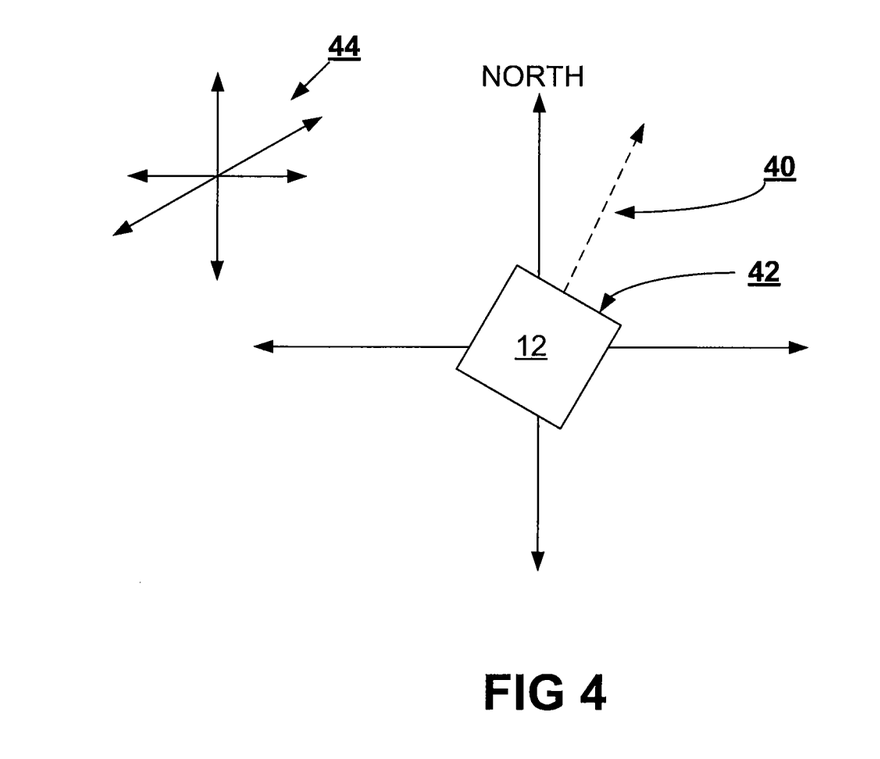
FIG. 4 illustrates exemplary geometric attributes of a control device.

The processor 36 may be operable to determine one or more geometric attributes about the control device 12. The one or more geometric attributes may be positional attributes, directional attributes, or a combination thereof. FIG. 4 illustrates one embodiment of determining a direction 40 of the control device 12. The direction 40 may be a pointing direction (i.e., the direction that the control device 12 is pointing), a movement direction (i.e., the direction that the control device is moving), or other type of direction. The processor 36 may use the directional device 30 to determine the direction 40, for example, that the control device 12 is pointing or heading. Determining the direction 40 (e.g., North, East, South, West, or a combination thereof) may include determining an azimuth (e.g., 0°, 90°, 180°, 270°, or a combination thereof, respectively). In the example of FIG. 4, the direction 40 may be North-East (NE) with an azimuth of approximately 20°. Fewer degrees of freedom may be used, such as determining heading without azimuth.

The processor 36 may use the positioning system 32 to determine a position 42 of the control device 12. The position 42 may be determined relative to a coordinate system 44. The position 42 may be a general location (e.g., grocery store), specific location (e.g., Building Z, 123 Oak St., San Jose), or physical coordinates (e.g., longitude and latitude coordinates). In one example, the physical coordinates may be a set of physical location coordinates that include one or more GPS coordinates. The GPS coordinates may be longitude and latitude coordinates, such as "−87.6214168,41.8902682,0," which may be located in an office in Chicago.

Referring back to FIG. 3, the memory 38 may include logic 38*a*, 38*b*, 38*c*, 38*d* encoded in one or more tangible media. Additional, different, or less logic may be encoded in the one or more tangible media. The logic 38*a* may be executed by the processor 36 to determine media device geometric attributes. Determining media device geometric attributes may include determining a media device direction and/or media device position. The logic 38*b* may be executed by the processor 36 to transmit the media device geometric attributes to the management system 16. The media device geometric attributes may be transmitted in a message, such as an identification request message. The logic 38*c* may be executed by the processor 36 to receive a digital sign identification from the management system 16 and logic 38*d* may be executed by the processor 36 to initiate communication with the digital sign 14 using the digital sign identification.

Figure 5:
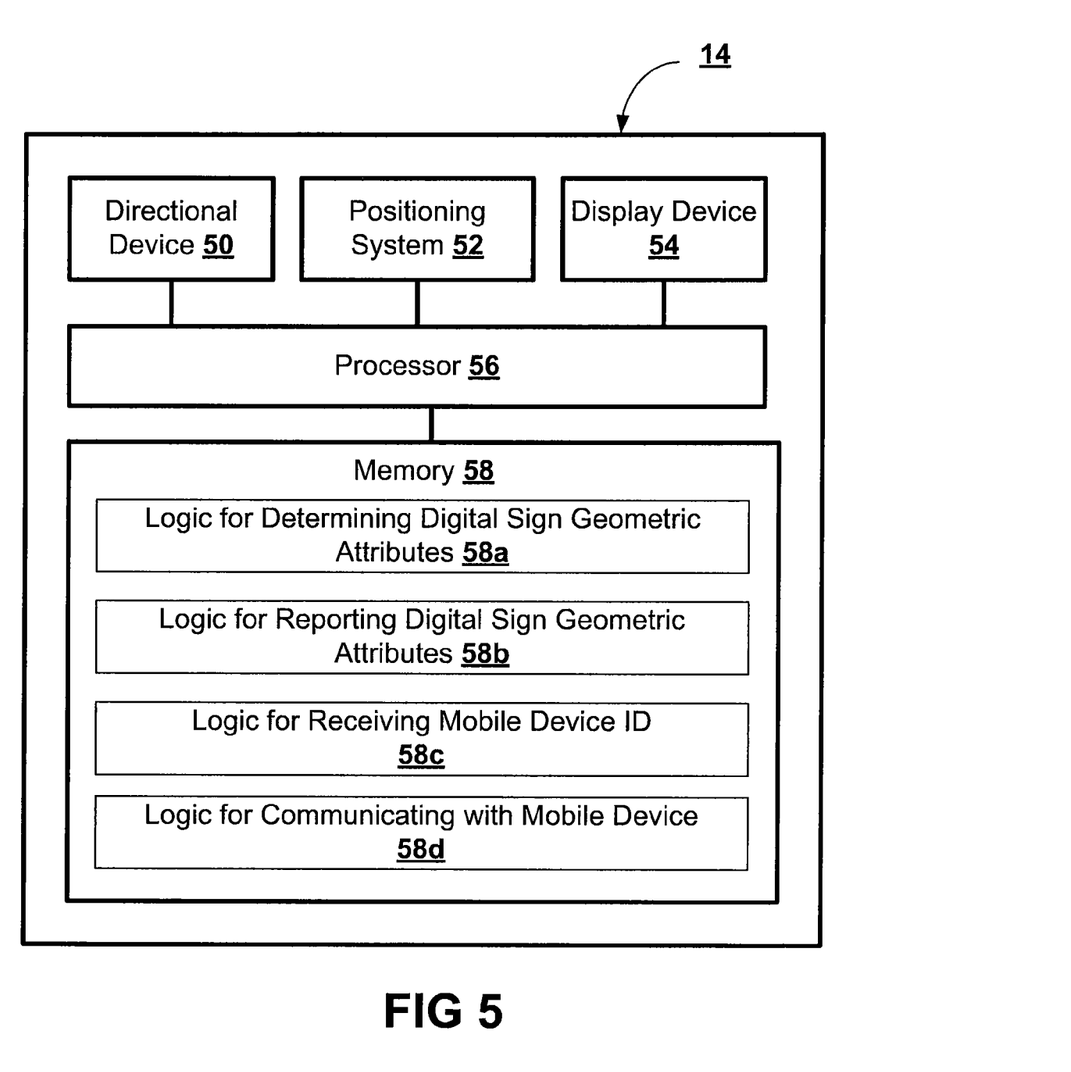
FIG. 5 illustrates one embodiment of a digital sign.

FIG. 5 illustrates one embodiment of the digital sign 14. The digital sign 14 may include a directional device 50, positioning system 52, display device 54, processor 56, and memory 58. The digital sign 14 may include additional, different, or fewer components. The digital sign 14 may be operable to determine geometric attributes about the digital sign 14, transmit the geometric attributes to the management system 16, and establish communication with the control device 12. The digital sign 14 may be a digital sign device, a display device, a liquid crystal display device, a light emitting diode device, plasma display, projection device, central processing unit, a combination thereof, or other device for displaying digital sign content, such as pictures, text, animations, video, audio, or a combination thereof.

As discussed above for the directional device 30, the directional device 50 may be an electronic compass, magnetic compass, fibre optic gyrocompass, magnetometer, three-axis compass chip, global positioning system, orientation device, electronic static heading device, other device or determining a direction that the digital sign 14 is pointing or heading, or any combination thereof. As discussed above for the positioning system 32, the positioning system 52 may be a global positioning system, navigation system, wireless positioning system, indoor positioning system, other system that is operable to determine a position of the digital sign 14, or a combination thereof. In alternative embodiments, the position and direction are entered or programmed, so the direction device 50 and positioning system 52 are not provided and/or used.

The display device 54 may be an electronic display device, a cathode ray tube (CRT), monitor, flat panel, a general display, LCD, projector, printer or other now known or later developed display device for outputting information. The electronic display device may display digital sign content, which may include one or more images, such as text, video, pictures, or other data.

The digital sign 14 may include additional, different, or fewer components. For example, in one embodiment, the digital sign 14 may include a communication interface that is operable to transmit messages to and receive messages from the control device 12 and/or management system 16. The communication interface may be an input and/or output interface and may be coupled with the network 18 of FIG. 1. In another embodiment, the digital sign 14 may include a controller that is configured to work only with the management system 16.

Figure 6:
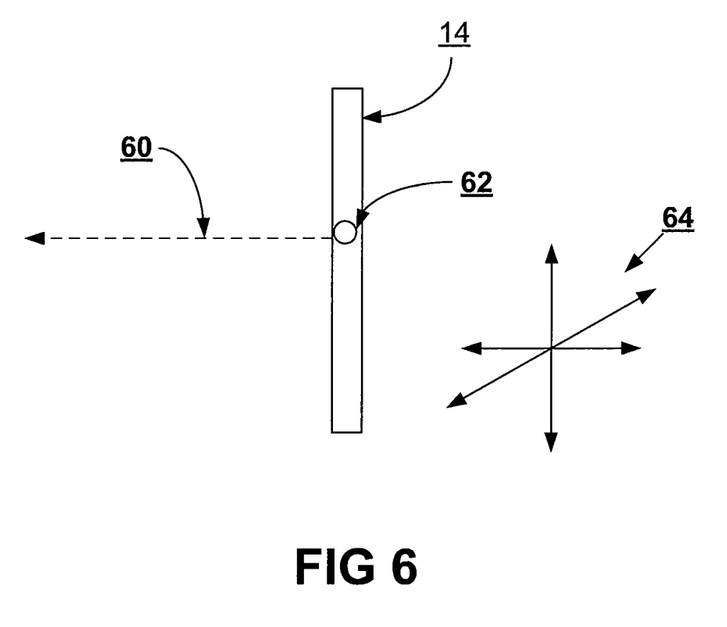
FIG. 6 illustrates exemplary geometric attributes of a digital sign.

In one embodiment, the processor 56 may be operable to determine one or more digital sign geometric attributes. As shown in FIG. 6, the processor 56 may be operable to use the directional device 50 to determine a direction 60 of the digital sign 14. The direction 60 may be a pointing direction (i.e., the direction that the digital sign 14 is pointing), a movement direction (i.e., the direction that the digital sign 14 is moving), or other type of direction. The direction 60 may be a geometric attribute. The processor 56 may use the directional device 50 to determine the direction 60, for example, that the digital sign 14 is pointing or heading. Alternatively, during installation, the direction 60 may be recorded and stored in memory. Determining the direction 60 (e.g., North, East, South, West, or a combination thereof) may include determining an azimuth (e.g., 0°, 90°, 180°, 270°, or a combination thereof, respectively) or not. In the example of FIG. 6, the direction 60 may be West (W) with an azimuth of approximately 270°.

The processor 56 may be operable to use the positioning system 52 to determine a position 62 of the digital sign 14. The position 62 may be determined relative to a coordinate system 64. The coordinate system 44 may be the same or similar to the coordinate system 64. The position 62 may be a general location (e.g., grocery store), specific location (e.g., Building Z, 123 Oak St.), or physical coordinates (e.g., longitude and latitude coordinates). In one example, the physical coordinates may be a set of physical location coordinates that include one or more GPS coordinates. The GPS coordinates may be longitude and latitude coordinates, such as "−87.6214157,41.8902682,0."

The processor 56 may be operable to use the input/output 54 to transmit and/or receive messages including the geometric attributes, such as the direction 60 and position 62, of the digital sign 14. Geometric attributes of the digital sign 14 may be continuously or periodically transmitted to the management system 16. Alternatively, the digital sign 14 may transmit the geometric attributes only once, for example, upon setup of the digital sign 14, or in response to a request.

Referring back to FIG. 5, the memory 58 may include logic 58*a*, 58*b*, and 58*c* encoded in one or more tangible media. Additional, different, or less logic may be encoded in the one or more tangible media. The logic 58*a* may be executed by the processor 56 to determine digital sign geometric attributes. Determining digital sign geometric attributes may include determining a digital sign direction and/or digital sign position. The logic 58*b* may be executed by the processor 56 to transmit the digital sign geometric attributes to the management system 16. The digital sign geometric attributes may be transmitted in a message, such as a setup message or answer message. The logic 58c may be executed by the processor 36 to receive a control device identification from the management system and logic 58d may be executed by the processor 56 to initiate communication with the digital sign 14 using the control device identification. Alternatively, the logic 58d may be executed to receive, accept, and maintain communication from the control device 12.

Figure 7:
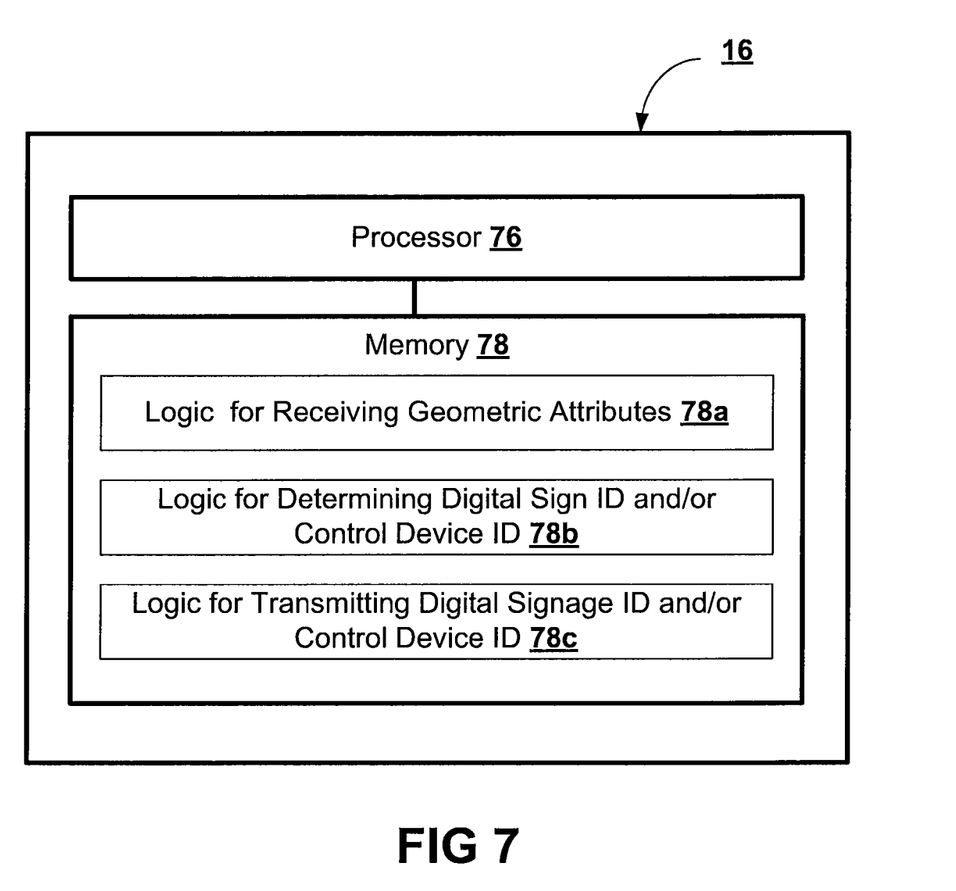
FIG. 7 illustrates one embodiment of a management system.

FIG. 7 illustrates one embodiment of the management system 16. The management system 16 may include a processor 60 and memory 62. Additional, different, or fewer components may be provided. The management system 16 may be a central management system, server, personal computer, router, switch, gateway, computing terminal, control device, or other device for establishing communication between the control device 12 and the digital sign 14 that the control device 12 is attempting to control. The management system 16 may be coupled with a plurality of control devices 12 and/or digital signs 14. The management system 16 may be included as part of one or more of the digital signs 14 or the control device 12.

Figure 8:
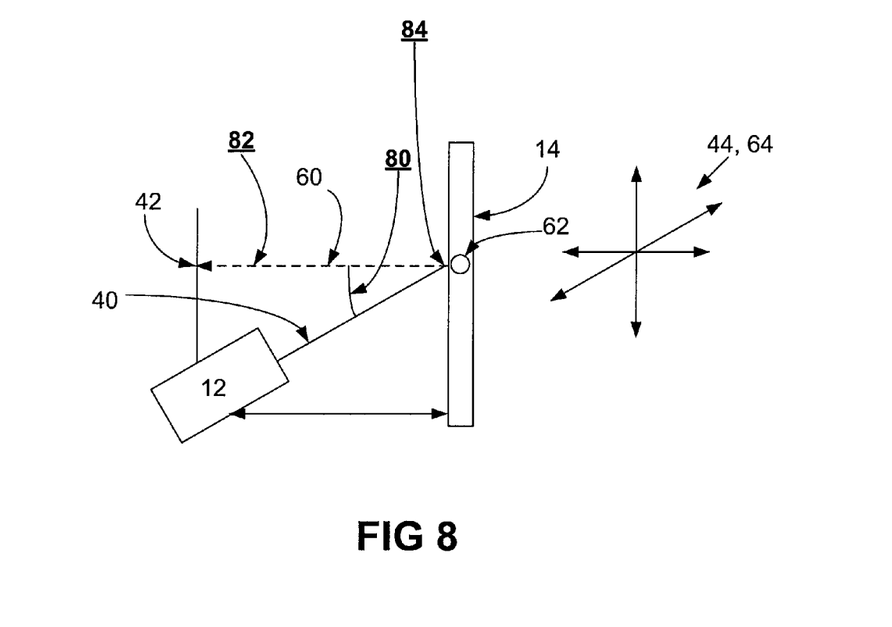
FIG. 8 illustrates one embodiment of determining exemplary geometric attributes, such as a control device distance, control device angle, and intersection point.

Upon receiving control device geometric attributes and/or digital sign geometric attributes, the processor 60 may be operable to determine combination geometric attributes. Combination geometric attributes are attributes for the combination of control device 12 and a digital sign 14 and may be determined based on control device geometric attributes and digital sign geometric attributes. Referring to FIG. 8, the combination geometric attributes may include, for example, a control device angle 80, a control device distance 82, an intersection point 84, any other geometric attribute that may be used to determine a specific screen that the control device 12 is attempting to control, or any combination thereof. Geometric attributes may include size, shape, direction, intersection, relative position of components, and/or properties of space.

The control device relative angle 80 may be determined based on the direction of the control device 40 and the direction of the digital sign 76 (i.e., the norm of the digital sign). The device angle 80 may be the angle between the direction 40 of the control device and the direction 76 of the digital sign or between the control device 40 and a reference direction (e.g., North). Three-dimensional or two-dimensional vector analysis may be used to determine the control device angle 80. Three-dimensional vector analysis may be used, for example, when the directional devices 30 and 50 include three-axis electronic compass chips that are operable to determine a direction in three-dimensions.

The control device distance 82 may be determined based on the position of the control device 42 and the position of the digital sign 62. The control device distance 82 may be a distance between the control device 12 and the digital sign 14. The distance 72 may span from one or more points (e.g., front, back, middle, center, top, or bottom) on the control device 12 to one or more points (e.g., front, back, middle, center, top, or bottom) on the digital sign 14. In one embodiment, the distance 72 may be calculated based on GPS coordinates of the control device 12 and digital sign 14. The management system 16 may determine the difference between the coordinates and use the difference to determine the control device distance 82.

The intersection point 84 may be determined based on position of the digital sign 62 and the direction of the control device 40. The intersection point 84 may be a position that the direction of the control device 40 intersects a screen plane of the digital sign 14. For example, the intersection point 84 may be a coordinate of the intersection of the screen plane and the line from the device. In some cases, the intersection point 84 must be right in the middle of the digital sign 14, while in other cases the intersection may deviate from the middle of the digital sign 14, for example, toward an edge of the digital sign 14 or even outside the edges of the digital sign 14.

The management system 16 may identify a set of potential digital signs that the control device 12 may be attempting to control. The set of potential digital signs may include zero, one, some, or all of the digital signs 14 for which the management system 16 has geometric attributes. The set of potential digital signs may be defined based on a limiting criteria, such as distance, topic, display content, location, or a combination thereof. For example, the management system 16 may identify the digital signs 14 that are within a certain distance (e.g., 5 feet, 10 feet, 100 yards, 1 mile, etc.) of the control device 12. In another example, the management system 16 may identify the digital signs 14 that are displaying certain content (e.g., schedules, advertising, etc.). The user U1 may define the content and the control device 12 may transmit the defined content to the management system 16. In yet another example, the management system 16 may identify digital signs 14 that are at a general or specific location (e.g., in front of a coffee shop, in a hallway, in a conference center, in San Jose, etc.). The set of potential digital signs may be used to reduce the number of calculations required to identify the one or more digital signs 14 that the control device 12 is attempting to control. The limiting criteria may be predefined or set by the User U1.

The management system 16 may determine the combination geometric attributes for the control device and each of the digital signs 14 in the set of potential digital signs. Once determined, the management system 16 may identify one or more digital signs 14 that the control device 12 is attempting to control by comparing the combination geometric attributes to one or more geometric attribute ranges for the one or more digital signs 14. The geometric attribute ranges may be stored in an attribute/identification record 90.

Figure 9:
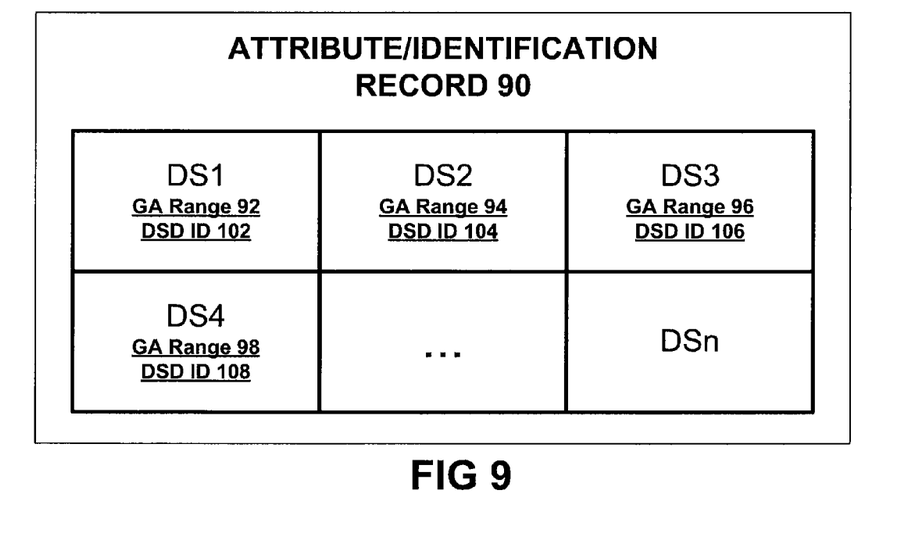
FIG. 9 illustrates one embodiment of an attribute/identification record that may be used to determine a digital sign identification.

FIG. 9 illustrates one embodiment of an attribute/identification record 90. The management system 16 may compare the combination geometric attributes to the geometric attribute ranges 92, 94, 96, 98 of the digital signs 14 (shown as DS1, DS2, DS3, DS4 in FIG. 9). The geometric attribute ranges 92, 94, 96, 98 may be defined for a group of screens or each individual screen by system administrators. An exemplary geometric attribute range for control device angle 80 may be 20-40. An exemplary geometric attribute range for control device distance 82 may be 5 feet-10 feet. An exemplary geometric attribute range for intersection point 84 may be 2 inches-4 feet. Other ranges may be used. The geometric attribute ranges 92, 94, 96, 98 may be narrow (e.g., smaller) or broad (e.g., larger) depending on the number of digital signs 14 that are placed in proximity to a digital sign 14. For example, the geometric attribute ranges may be narrow to avoid potential overlaps. For areas where screens are sparse (i.e., placed at a greater distance from each other), ranges may be greater to give users more flexibility in controlling screens.

The management system 16 may determine one or more digital signs 14 that the control device 12 is attempting to control based on a geometric attribute difference between the combination geometric attributes and the geometric attribute ranges 92, 94, 96, 98. The geometric attribute difference may be determined by comparing the geometric attributes of the control device 12 and digital sign 14 (e.g., control device angle 80, control device distance 82, and/or intersection point 84) and the geometric attribute ranges 92, 94, 96, 98. The geometric attribute difference for the digital signs 14 may be compared to the geometric attribute differences of the other digital signs 14. The geometric attribute difference may be an aggregated difference or individual difference. For example, geometric attribute difference may be an aggregation of some or all the geometric attributes (e.g., angle, distance, intersection point) or of only one geometric attribute (e.g., intersection point). For example, the geometric attribute difference for DS1 may be compared to the geometric attribute difference for DS2. The digital signs DS1 or DS2 with the smaller difference may be identified as the digital sign that the control device 12 is attempting to control. In other embodiments, a larger difference may be used to identify the digital sign. The management system 16 may include an enhanced search mechanism to efficiently find the right screen in a pre-sorted list of screens.

Once the management system 16 identifies the one or more digital signs 14, the management system 16 may transmit the digital sign identification 102, 104, 106, 108 to the control device 12. The digital sign identification 102, 104, 106, 108 may be a unique identification or static identification. The digital sign identification 102, 104, 106, 108 may be, for example, a phone number, extension number, address, or other identification that may be used to establish communication with the digital sign.

Once the digital sign identification 102, 104, 106, 108 is received, the control device 12 may use the digital sign identification 102, 104, 106, 108 to establish communication with the identified digital sign 14.

Referring back to FIG. 7, the memory 78 may include logic 78a, 78b, and 78c encoded in one or more tangible media. The logic 78a may be executed by processor 76 to receive control device geometric attributes and/or digital sign geometric attributes. The logic 78b may be executed by processor 76 to determine a digital sign identification and/or control device identification. Determining the digital sign identification and/or control device identification may include determining combination geometric attributes and comparing the combination geometric attributes to geometric attribute ranges to determine the digital sign that the control device is attempting to control. The logic 78c may be executed by processor 76 to transmit the digital sign identification and/or control device identification. The digital sign identification may be transmitted to the control device. The control device identification may be transmitted to the digital sign.

The processors 36, 56, 76 are general processors, digital signal processors, application specific integrated circuits, field programmable gate arrays, analog circuits, digital circuits, combinations thereof, or other now known or later developed processors. The processors 36, 56, 76 may be single devices or a combination of devices, such as associated with a network or distributed processing. Any of various processing strategies may be used, such as multi-processing, multi-tasking, parallel processing, or the like. Processing may be local, as opposed to remotely. Processing may be moved from one processor to another processor. For example, the processor 36 is operable to perform processing completed by the processor 56. The processors 36, 56, 76 are responsive to logic encoded in tangible media. The logic may be stored as part of software, hardware, integrated circuits, firmware, micro-code or the like.

The memories 38, 58, 78 may be computer readable storage media. The computer readable storage media may include various types of volatile and non-volatile storage media, including but not limited to random access memory, read-only memory, programmable read-only memory, electrically programmable read-only memory, electrically erasable read-only memory, flash memory, magnetic tape or disk, optical media and the like. The memory 38, 58, 78 may be single devices or combinations of devices. The memory 38, 58, 78 may be adjacent to, part of, programmed with, networked with and/or remote from the processors 36, 56, 76.

The processors 36, 56, 76 may be operable to execute logic encoded in one or more tangible media, such as memory 38, 58, 78. Logic encoded in one or more tangible media for execution is defined as instructions that are executable by the processor and that are provided on the computer-readable storage media, memories, or a combination thereof. The processor 31 is programmed with and executes the logic. The functions, acts or tasks illustrated in the figures or described herein are executed in response to one or more sets of logic or instructions stored in or on computer readable storage media. The functions, acts or tasks are independent of the particular type of instructions set, storage media, processor or processing strategy and may be performed by software, hardware, integrated circuits, firmware, micro code and the like, operating alone or in combination.

Figure 10:
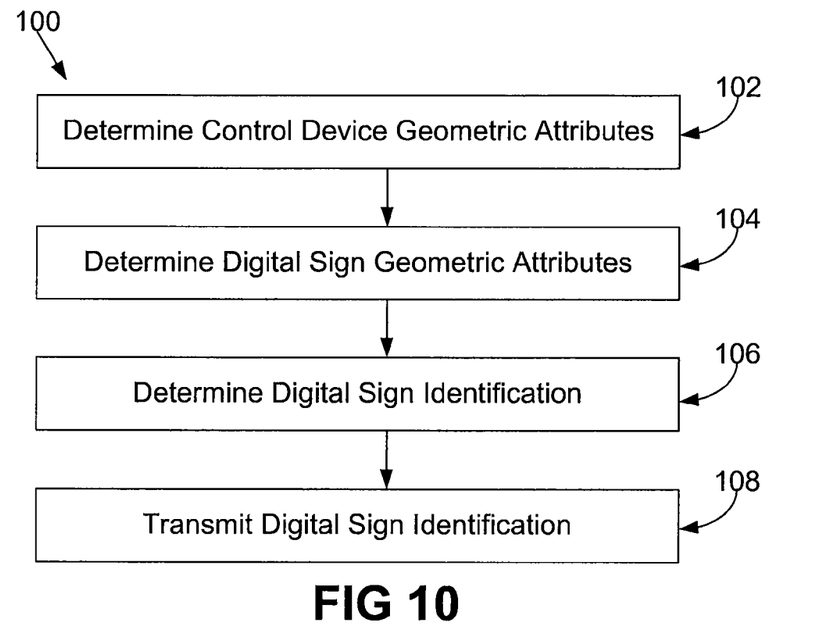
FIG. 10 illustrates one embodiment of a method for pairing a control device with a digital sign.

FIG. 10 illustrates one embodiment of a method 100 for pairing a control device with a digital sign. In acts 102 and 104, a management system may receive control device geometric attributes and digital sign geometric attributes. The control device geometric attributes may define geometric attributes of the control device. The digital sign geometric attributes may define geometric attributes of the digital sign that the control device is attempting to control. The geometric attributes include directional attributes and/or positional attributes. Receiving control device geometric attributes may include receiving a request message from the control device. The request message may define control device geometric attributes and a request for the digital sign identification.

In act 106, a digital sign identification may be determined based on the control device geometric attributes and the digital sign geometric attributes 106. Determining the digital sign identification may include determining combination geometric attributes and comparing the combination geometric attributes to geometric attribute ranges to identify the digital sign that the control device attempting to control. The combination geometric attributes may include a control device angle, a control device distance, and/or an intersection point. The control device angle is an angle between a control device direction and a digital sign direction. The control device distance is a distance between a control device position and a digital sign position. The intersection point is a position where the control device direction intersects a digital sign plane. The digital sign identification defines the digital sign that the control device is attempting to control. Determining the digital sign identification may further includes determining the digital sign with the geometric attribute range that is closest to the combination geometric attributes. The method 100 may also include transmitting the digital sign identification to the control device, as shown in act 108.

Figure 11:
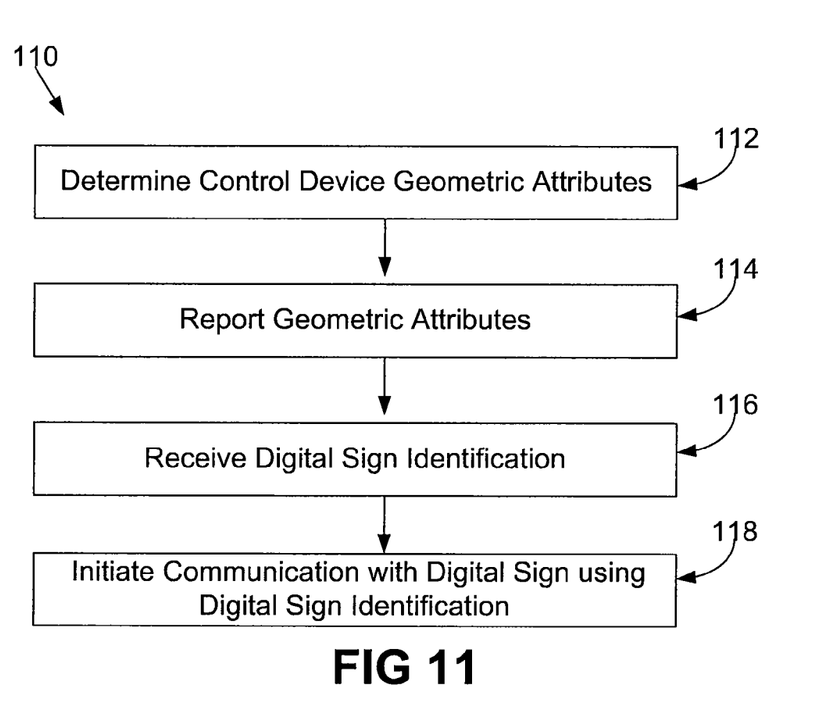
FIG. 11 illustrates one embodiment of a method for establishing communication with a digital sign.

FIG. 11 illustrates one embodiment of a method 110 for establishing communication with a digital sign. As shown in act 112, a control device may determine control device geometric attributes for the control device. The control device may be attempting to control the digital sign. The geometric attributes may include directional attributes and positional attributes. Determining control device geometric attributes may include determining a control device position using a positioning device. Determining control device geometric attributes may include determining a control device direction using a directional device. The directional device may be an electronic compass. In act 114, reporting the control device geometric attributes. Reporting may include transmitting an identification request message that includes the control device geometric attributes and a request for the digital sign identification. In act 116, the control device may receive, in response to reporting the control device geometric attributes, a digital sign identification that defines the digital sign. In act 118, the control device may initiate communication with the digital sign using the digital sign identification.

Various embodiments described herein can be used alone or in combination with one another. The foregoing detailed description has described only a few of the many possible implementations. For this reason, this detailed description is intended by way of illustration, and not by way of limitation.

The invention claimed is:

1. A method comprising:
   determining, by a control device, one or more of location and direction of the control device;
   reporting, by the control device, the one or more of location and direction to a management system configured to pair the control device with a digital sign of a plurality of digital signs according to the one or more of location and direction, the reporting occurring over a wide area network (WAN), and the pairing including authenticating the control device to communicate with the digital sign;
   receiving, by the control device, a digital sign identification that identifies the digital sign according to the reporting, the digital sign identification received over the WAN from the management system; and
   initiating, by the control device, communication with the digital sign using the digital sign identification, the control device and the digital sign being communicatively coupled over a local area network, the WAN, or both.

2. The method of claim 1, wherein the initiating includes automatically initiating such that manual input is not required.

3. The method of claim 1, wherein the reporting occurs when the control device is within a predetermined distance from the digital sign.

4. The method of claim 1, wherein the reporting occurs when the control device is pointing at the digital sign.

5. An apparatus comprising:
   a processor configured to:
   determine control device geometric attributes of a control device attempting to control a digital sign of a plurality of digital signs;
   report the control device geometric attributes to a management system configured to pair the control device with the digital sign according to the geometric attributes, the reporting occurring over a wide area network (WAN), and the pairing including authenticating the control device to communicate with the digital sign;
   receive a digital sign identification that identifies the digital sign, according to the reporting, the digital sign identification received over the WAN from the management system; and
   initiate communication over the WAN with the digital sign using the digital sign identification.

6. The apparatus of claim 5, further comprising: a positioning device configured to determine location of the control device.

7. The apparatus of claim 6, wherein the positioning device is a global positioning system (GPS) device.

8. The apparatus of claim 5, further comprising: a directional device configured to determine direction of the control device.

9. The apparatus of claim 8, wherein the directional device is an electronic compass.

10. The apparatus of claim 5, wherein the control device geometric attributes include location, direction, or both location and direction.

11. The apparatus of claim 5, wherein the reporting occurs in response to the control device being within a predetermined distance from the digital sign.

12. The apparatus of claim 5, wherein the reporting occurs in response to the control device being pointed at the digital sign.

13. The apparatus of claim 5, wherein the processor is further configured to:
    receive an indication of a predetermined distance from the digital sign, over the WAN from the management system; and
    report the control device geometric attributes to the management system over the WAN, in response to the control device being within the predetermined distance, according to the indication of the predetermined distance from the digital sign.

14. The apparatus of claim 13, wherein the processor is further configured to initiate communication over the WAN with the digital sign using the digital sign identification as a result of the control device being within the predetermined distance from the digital sign, and wherein the initiation includes automatically initiating such that manual input is not required.

15. The apparatus of claim 5, wherein the digital sign identification includes a WAN address of the digital sign, and wherein the the processor is further configured to initiate communication with the digital sign according to the WAN address of the digital sign.

16. The method of claim 3, further comprising receiving, by the control device, an indication of the predetermined distance, over the WAN from the management system.

17. The method of claim 3, wherein the initiating includes automatically initiating such that manual input is not required and occurs when the control device is within the predetermined distance from the digital sign.

18. The method of claim 1, wherein the digital sign identification includes a WAN address of the digital sign, and wherein the the control device communicates with the digital sign according to the WAN address of the digital sign.

19. A control device, comprising:
    circuitry, configured to:
    determine one or more of location and direction of the control device; and
    report the one or more of location and direction to a management system configured to pair the control device with a digital sign of a plurality of digital signs according to the one or more of location and direction, over a wide area network (WAN), and the pairing including authenticating the control device to communicate with the digital sign;
    a WAN communications interface, configured to receive a digital sign identification that identifies the digital sign according to the reporting, the digital sign identification received over the WAN from the management system; and
    a local area network (LAN) communications interface, configured to communicate with the digital sign using the digital sign identification over the LAN.

20. The control device of claim 19, wherein the circuitry includes a global positioning system (GPS) device.

21. The control device of claim 19, wherein the circuitry includes an electronic compass.

22. The control device of claim 19, wherein the circuitry is further configured to report the one or more of location and direction to the management system configured to pair the control device with the digital sign, over the WAN, when the control device is within a predetermined distance from the digital sign.

23. The control device of claim 19, wherein the WAN communications interface is further configured to receive an indication of a predetermined distance, over the WAN from the management system.

24. The control device of claim 23, wherein the LAN communications interface is further configured to communicate over the LAN with the digital sign using the digital sign identification as a result of the control device being within the predetermined distance from the digital sign, and wherein initiation of the communication over the LAN with the digital sign includes automatically initiating the communication such that manual input is not required.

25. The control device of claim 19, wherein the digital sign identification includes a corresponding LAN address of the digital sign.

* * * * *